RE 25934

June 19, 1962     A. CHAUSSON     3,039,395
ELECTROMAGNETICALLY-CONTROLLED COMPRESSING
AND PUMPING DEVICES Filed July 28, 1959     3 Sheets-Sheet 1

INVENTOR
ANDRÉ CHAUSSON
BY

INVENTOR
ANDRÉ CHAUSSON
BY

June 19, 1962 A. CHAUSSON 3,039,395
ELECTROMAGNETICALLY-CONTROLLED COMPRESSING
AND PUMPING DEVICES
Filed July 28, 1959 3 Sheets-Sheet 3
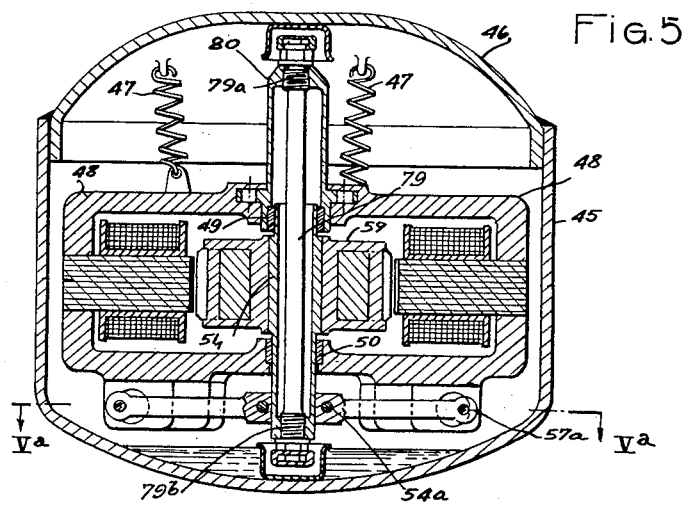
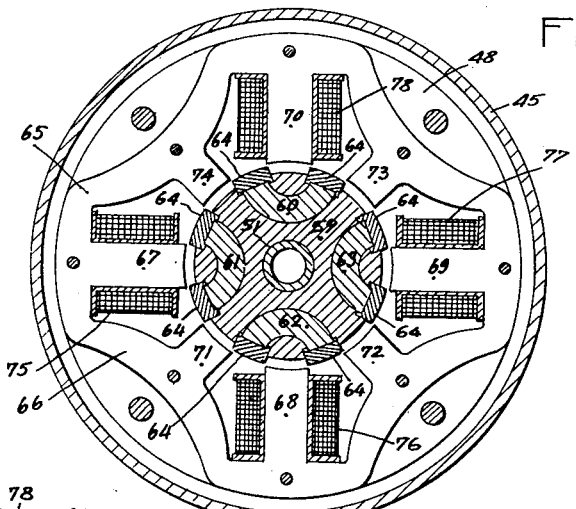
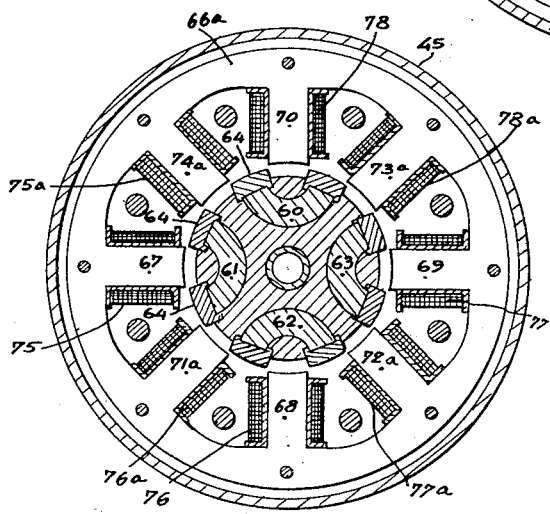
INVENTOR
ANDRÉ CHAUSSON United States Patent Office 3,039,395
Patented June 19, 1962

3,039,395
ELECTROMAGNETICALLY-CONTROLLED COMPRESSING AND PUMPING DEVICES
André Chausson, Asnieres, France, assignor to Societe Anonyme des Usines Chausson, Asnieres, France, a French company
Filed July 28, 1959, Ser. No. 830,091
Claims priority, application France July 31, 1958
7 Claims. (Cl. 103—53)

The present invention relates to a device for the compression of gases and, if required, the pumping of liquids, this device being of the type which operates under electro-magnetically-sustained vibratory motion.

The particular embodiment of the device according to the invention permits of production of the device in particularly compact form, thus enabling it to be used as a cold-generating fluid compressor in refrigeration plants.

A further advantage of the device according to the invention resides in the fact that it is of extremely simple construction.

According to the invention, the electromagnetically-controlled compressing and pumping device comprises a fixed iron circuit and a mobile polarized armature cooperating with elastic members which confer upon it a vibration frequency less than the frequency of an A.C. current feeding the windings of the iron circuit, said iron circuit being integral with at least one cylinder within which slides a piston controlled by the cylindrically-shaped armature which is itself mounted on a shaft connected to said elastic members and which comprises permanent magnets the number of which is equal to half the number of spaces formed between the poles of the iron circuit, said poles being arranged so as to surround this armature and being magnetically interconnected in pairs, via the magnets of the armature, to form magnet keepers the field of polarization of which induces, in the windings of successive poles of the iron circuit, magnetic currents which are reversed at each cycle of the current feeding into these windings.

Several other characteristics will in any case become apparent from the following detailed description.

Forms of embodiment of the invention are shown, by way of example, in the accompanying drawings.

FIGURE 3 is a section view along the line III—III in FIGURE 1.

FIGURE 4 is a section view similar to that in FIGURE 3, but which illustrates a modification.

FIGURE 5 is a section, similar to FIGURE 1, of a variant.

Figure 1:
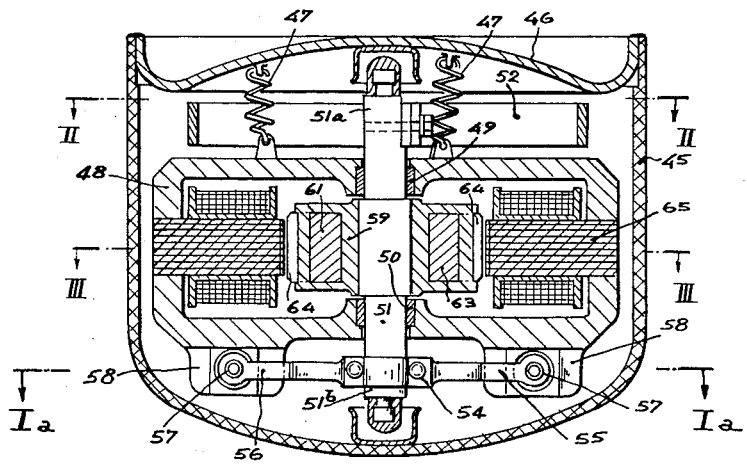
FIGURE 1 is a cross elevational section view illustrating a form of execution of the compressing device.
Figure 2:
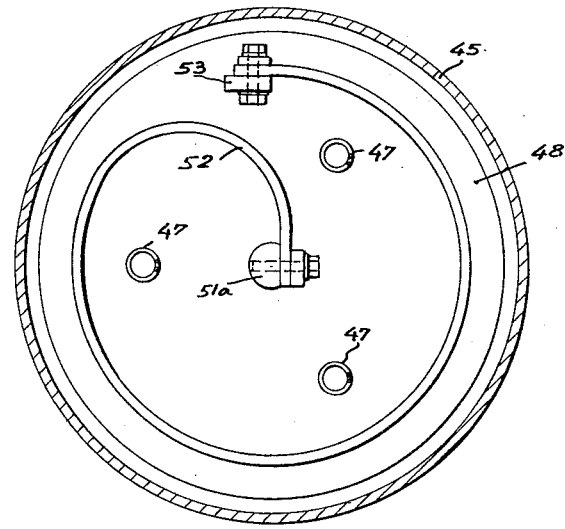
FIGURE 2 is a section view along the line II—II in FIGURE 1.

In FIGURES 1 to 5a, the compressing device is housed in a container 45 sealed by a lid 46 on to which the device is hung by means of elastic members 47, in the number, say, of three.

The body of the compressing device is so shaped as to form a housing 48, of annular shape, carrying centrally located bearings 49 and 50 which may either be of the plain or needle-bearing type, for example. The bearings 49 and 50 carry a shaft 51 the end 51a of which is rendered integral with a substantially spirally-coiled spring blade 52 the free end of which is secured to an anchoring piece 53 (FIGURE 2) carried by the housing 48 forming the body of the device.

Figure 1A:
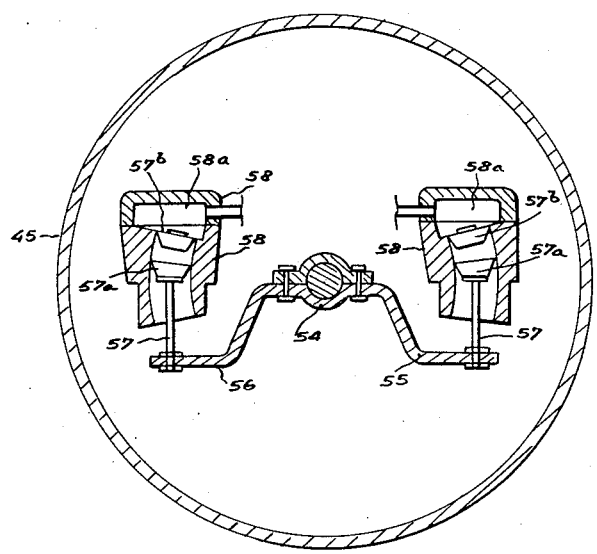
FIGURE 1a is a sectioned view along the line Ia—Ia in FIGURE 1.
Figure 5A:
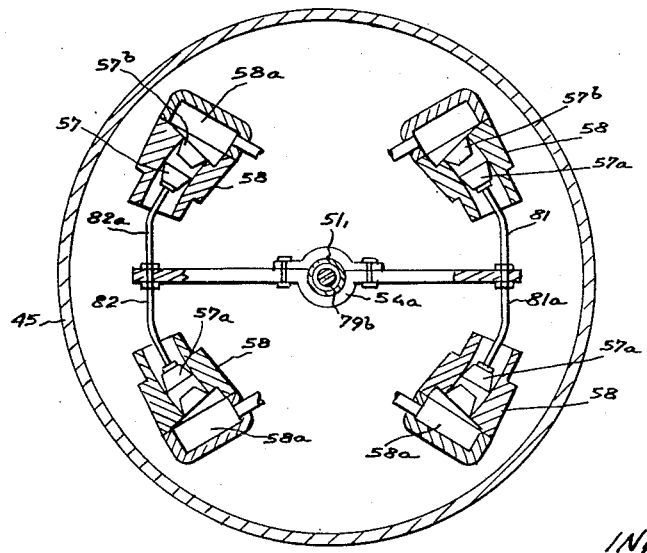
FIGURE 5a is a section view along the line Va—Va in FIGURE 5.

The other end 51b of the shaft 51 is keyed to a lever 54, preferably provided with two arms 55 and 56 the ends of which are designed to cooperate with rods 57 connected to pistons 57a slidably mounted in cylinders 58 which are also carried by the housing 48. The pistons 57a are driven by the rods 57 so as to be able to slide within the cylinders, the bores of which are shaped in the form of toroidal sections concentric with the shaft 51 (FIGURE 1a). These cylinders communicate with the inside of the casing 45 via one of their ends and are isolated from delivery chambers 58a, formed into the housing 58, by means of valves 57b shaped similarly to the pistons 57a, the latter being themselves provided, like the valves, with deformable flexible linings. At mid-length, the shaft 51 carries a cylindrical member 59 made of a metal which is non-magnetic but which is a conductor of electricity (hereinafter referred to as "rotor"), in which cylindrical member embedded permanent magnets 60, 61, 62 and 63 substantially of circular-arc shape, as shown in FIGURES 3 and 4 in particular.

In addition, the rotor 59 carries cheeks or polar pieces 64 made of magnetic metal which are arranged so as to enclose the ends of each of the magnets 60 to 63 and to protrude slightly beyond the periphery of the rotor 59.

As shown in the drawing, the outer wall of the polar pieces 64 is also shaped into the form of a circular arc concentric with the rotor 59. The magnets 60 to 63 together with their polar pieces constitute a polarised armature designed to cooperate with a magnetic circuit 65 carried by the housing 48.

As shown in FIGURE 3, the magnetic circuit comprises a one-piece block 66 made up, say, of magnetic laminations and forming main poles 67, 68, 69 and 70 and with secondary poles 71, 72, 73 and 74, respectively located between these main poles and so arranged that, at rest, the polar pieces 64 of magnets 60 to 63 shall be respectively positioned so as to cover up all the free space included between a main pole and a secondary pole. In this way, the permanent magnetic field generated by the various magnets can close through the magnetic circuit.

For instance, the lines of force of the magnet 60 may in part pass through the primary pole 70 and in part through the secondary poles 73 and 74, following naturally the paths of least magnetic resistance.

The main poles 67 to 70 are provided respectively with coils 75, 76, 77 and 78 which are intended to be directly supplied with A.C. current.

The magnetic field generated during an initial half-period of the A.C. current feeding the coils obviously tends to close up through the magnets 60 to 63, so that the latter are subjected to a degree of displacement which causes the rotor 59 to rotate in the direction whereby said permanent magnets 60 to 63 tend to take up a position for which the magnetic flux is at a maximum.

At the subsequent semi-alternation, displacement of the rotor is obviously reversed, so that the rotor is thus driven in sustained oscillating movement. The spring blade 52 connected to the shaft 51 and, hence to the rotor, is therefore made to vibrate by the latter. In the manner well-known per se, the no-load natural frequency of the moving assembly made up of the rotor 59, the shaft 51, the various components carried by this shaft and the blade 52, is so chosen that it is substantially less than that of the A.C. current supplying the coils, in order that the vibratory motion so obtained, though synchronous with the feed current, shall not be in tune therewith. Operation under near-resonant conditions is obtained only during normal functioning, that is to say, when the fluid compressed by the pistons 57a sliding in the cylinders 58 is in such condition that the elastic forces resulting therefrom are of sufficient magnitude to increase the natural vibration frequency of the moving assembly so as to cause this natural frequency to tend towards a value which is slightly less than that of the frequency of the A.C. current to the coils. As will be clearly understood from FIGURE 1a, one of the pistons 57a travels along its suction stroke whilst the other is on its compression stroke. It follows that the strokes of the two pistons are strictly equal about a position of equilibrium occupied when the apparatus is at rest.

FIGURE 4 illustrates a slight modification in accordance with which the secondary poles 71 to 74 in FIGURE 3 are replaced by main poles 71a, 72a, 73a and 74a provided with coils 75a to 78a similar to the coils 75 to 78.

In the interest of facilitating the execution of the magnetic circuit, it is preferable, according to FIGURE 4, to provide the block 66a of this iron circuit in the manner illustrated that is to say in the form of a ring.

The manner of working according to the modification in FIGURE 4 is identical to that described hereinabove with reference to FIGURE 3, except that, for a given power output of the device, it is possible to reduce the outer dimensions of the latter and, as a result, the overall bulk of the compressing device, which is often an advantage.

FIGURE 5 illustrates a variant in which the magnetic circuit according to FIGURE 3 or that according to FIGURE 4, finds application indifferently.

According to this particular variant, the spring blade 52 is suppressed and replaced by a torsion bar 79 the extremity 79a of which is anchored in a rigid support 80, itself carried by that part of the housing 48 which comprises the bearing 49 within which rotates a hollow shaft 51₁ bearing the rotor 59. In addition, this hollow shaft 51₁ is supported by the bearing 50 and protrudes beneath the housing 48 so that it may be keyed to the free end 79b of the torsion bar 79. This hollow shaft 51₁ carries, in the same way as the shaft 51 in FIGURE 1, a beam lever 54a comprising two arms 55a and 56a the extremities of which are connected to piston-rods 81, 81a and 82, 82a actuating four pistons 57a, respectively accommodated in four cylinders 58 which are constituted exactly as described hereinabove with reference to FIGURE 1a. This four-cylinder arrangement allows balancing the efforts transmitted to the pistons, so that no harmful reaction forces are applied to the hollow shaft 51₁, which is a particularly advantageous feature obviating undue wear on the bearing 50. Furthermore, with this arrangement, it becomes possible to construct a multi-stage compressor wherein all stresses transmitted are entirely balanced out.

While we have described a plurality of embodiments, it is to be clearly understood that our invention is by no means limited to the particular forms described in detail hereinbefore with reference to the accompanying drawings, which are given by way of example only and not in any limiting sense, but that on the contrary many modifications may be made without departing from the scope of the invention.

I claim:
1. An electromagnetically-controlled compressing and pumping device of the character described, comprising a sealed container, a body of substantially cylindrical shape within said container, said body defining an inner housing and being provided with opposed apertures, bearings disposed in said apertures, a shaft fitted in said bearings and extending axially through said body, a lever fixed to said shaft externally of said body and provided at both ends with compressing means, a plurality of cylinders fixed to said body receiving said compressing means whereby relative oscillation between said body and said shaft will effect operation of said compressing means within said cylinders, a cylindrical core disposed within said body and fixed to said shaft, a plurality of arcuate permanent magnets within said core having their opposite ends disposed closely adjacent the periphery of said core, a plurality of radially extending pole members carried by said body and terminating closely adjacent the periphery of said core, an A.C. coil winding surrounding each of said pole members, there being twice as many pole members as there are permanent magnets.

2. An electromagnetically-controlled pumping and compressing device comprising a hollow container for holding a fluid to be compressed, a hollow body of generally cylindrical form mounted within said container, a shaft journaled axially within said body and projecting at one end exteriorly of the body, an armature fixed to said shaft within said body, a field cooperable with said armature including a plurality of pole pieces fixed to said body and extending inwardly toward said armature, an A.C. winding around each of said pole pieces whereby to cause relative oscillation between said shaft and said body when such windings are excited, said body having a portion rigid therewith presenting a chamber exterior to the body, a lever fixed to said one end of the shaft and having means carried thereby cooperable with said chamber in response to relative oscillation as aforesaid to induct fluid from within said container and compress the same, said body completely enclosing said armature and field and isolating the same from the fluid-receiving area of said container.

3. The assembly as defined in claim 2, wherein said body is provided with at least a pair of portions presenting exterior chambers at the lower end thereof, each such portion having a cylinder formed therein of circular cross-section and arcuated concentrically with the axis of said shaft, said lever extending in diametrically opposed directions from said shaft and wherein the means carried by the lever cooperable with the chambers includes a piston reciprocable within said cylinders.

4. The assembly as defined in claim 3, wherein said armature is in the form of a cylindrical core having a plurality of arcuate permanent magnets disposed therein, the opposite ends of each such permanent magnet being disposed closely adjacent the periphery of said core, there being twice as many pole pieces as there are permanent magnets, and torsional restoring means for resisting relative oscillation between said shaft and said body.

5. The assembly as defined in claim 2, wherein said shaft is tubular, a torsion bar extending concentrically inside such tubular shaft and having its lower end anchored to the lower end of such shaft, the upper end of said torsion bar being fixed to said body.

6. An electromagnetically-controlled compressing and pumping device comprising a sealed container, a generally cylindrical body disposed within said container and defining therewithin an inner housing isolated from the interior of said container, a shaft journaled in said body, a cylindrical core fixed to said shaft within said body, said core being provided with arcuate permanent magnets the ends of which are substantially in alignment with the periphery of the core, a field assembly rigid with said body including pole pieces extending radially inwardly toward said core with each such pole piece being provided with an A.C. winding thereabout whereby when such windings are excited, said shaft and body will be oscillated relative to each other, there being twice as many pole pieces as there are permanent magnets with the equilibrium position between the shaft and body being such that the pole pieces are disposed between the opposite ends of each of the corresponding permanent magnets, and means for restoring said shaft and body to their equilibrium position.

7. The assembly as defined in claim 6 wherein said body is provided in the lower region thereof with at least two cylinder blocks rigid therewith and having cylinders of circular cross-section formed therein arcuated concentrically with relation to said shaft with such cylinders being disposed exteriorly of such body, a lever rigid with one end of said shaft and disposed exteriorly of said body, piston rods carried by the opposite ends of said lever and having pistons carried thereby operable within said cylinders.

References Cited in the file of this patent
FOREIGN PATENTS
1,177,892 France _____ Dec. 8, 1958